Jan. 7, 1930.  F. O. TANNER  1,742,795
APPARATUS FOR MAKING PISTONS
Filed April 28, 1926   3 Sheets-Sheet 1

Inventor
Floyd O. Tanner

Jan. 7, 1930.  F. O. TANNER  1,742,795
APPARATUS FOR MAKING PISTONS
Filed April 28, 1926  3 Sheets-Sheet 3

Inventor
Floyd O. Tanner
By Blackmore, Spencer & Fli[...]
Attorneys

Patented Jan. 7, 1930

1,742,795

UNITED STATES PATENT OFFICE

FLOYD O. TANNER, OF DETROIT, MICHIGAN, ASSIGNOR TO GENERAL MOTORS CORPORATION, OF DETROIT, MICHIGAN, A CORPORATION OF DELAWARE

APPARATUS FOR MAKING PISTONS

Application filed April 28, 1926. Serial No. 105,206.

This invention relates to pistons and articles of similar shape. It is an object of the invention to provide a novel apparatus for the manufacture of pistons for motors and similar machines. By the method of manufacture used an improved article is produced and also considerable saving in production is effected. To this end the invention aims to provide an apparatus for the manufacture of a piston from a sheet metal blank by the means of a punch and a plurality of dies. The manufacture of the piston is completed by the flattening of the head and the making of wrist pin bearings integral with the walls of the piston.

In carrying out the invention, use is made of the special apparatus which is shown in the drawing and which is herein described.

In the drawing, Figure 1 is a side elevation, partly in section, of the apparatus used for transforming a circular blank of sheet metal into the form of a cup or piston.

Figure 1:
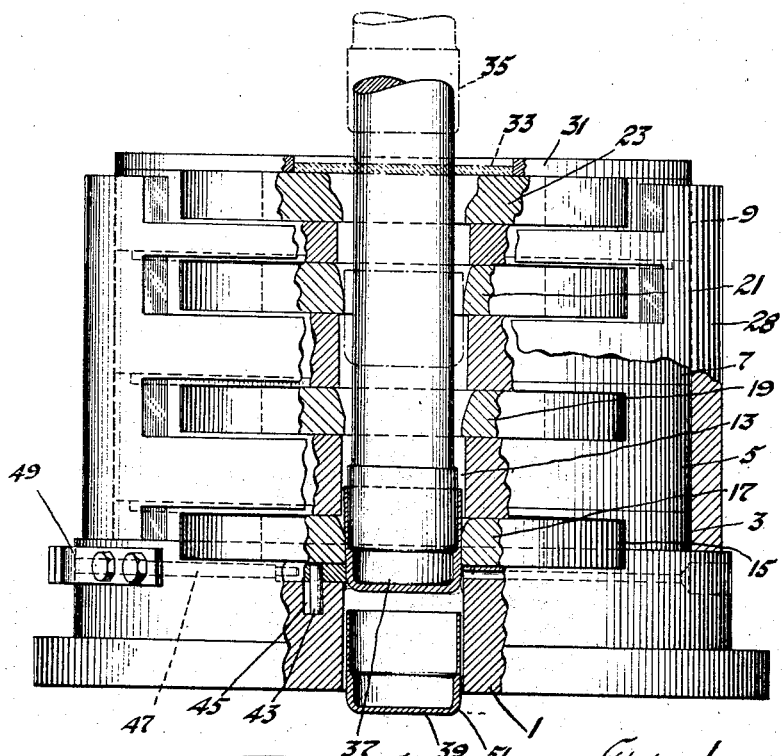

Referring by reference characters to the drawing, numeral 1 is a base upon which are mounted, one upon another, carrier members 3, 5, 7 and 9. These carrier members are secured to the base by bolts 11. A central opening, as at 13, is provided in each of the carrier members and in the base. Received within recesses in the several carrier members are annular members 15 carrying dies 17, 19, 21 and 23. The dies have openings in alinement which are of progressively reduced size from the uppermost to the lowermost die. The carrier members are opened at one side, as shown by dotted lines 25 in Figure 2, to permit the removability of the dies. These openings may be closed by a closure 27. An outer split cylindrical ring member 28 is arranged around the assembly, the split being shown in Figure 2 as extending slightly beyond the ends of the closure 27. By turning the split cylindrical member 28 to the position shown in Figure 2 it will be possible to remove the closure members 27 and thereafter the die carrying members for the purpose of repair or replacement. The removability may conveniently be accomplished by engaging the end of a rod in openings 29 provided therefor in the closures and in the members 15. A top plate 31 has a central opening to receive a blank and sheet metal 33 from which the piston is to be formed. A plunger 35 is arranged to reciprocate from above through the aligned openings in the dies. It has a reduced end 37 for the purpose of forming the piston with a thickened portion in the wall near its head. It will be understood from an inspection of Figure 1 that the plunger forces the blank down through the several dies.

Figure 2:
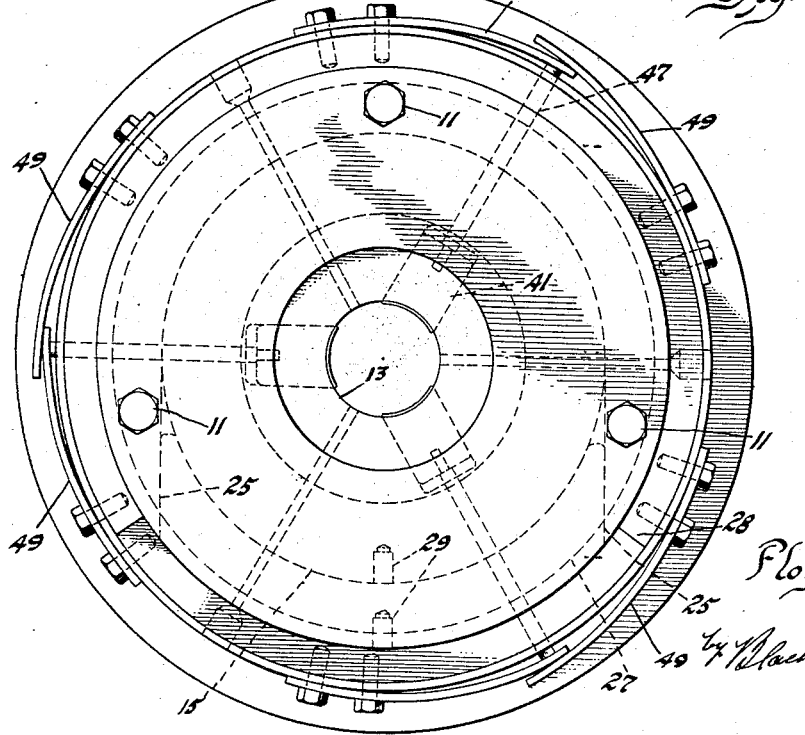
Figure 2 is a plan view of the same.

Means should be provided to insure the separation of the cup shaped piston member shown at 39, Figure 1. For that purpose I use plates 41 having pins 43 guided in slots 45 of the base. Rods 47 extend from the plates to the outside of the base. Springs 49 are secured to the outer face of the base and engage the ends of rods to normally press them inwardly. The descending piston forces the plates outwardly against the tension of the spring. When the upper edge of the piston descends below the plates, the spring forces the plates inwardly sufficiently to engage the upper piston edge. The withdrawal of the plunger thereafter leaves the piston to fall out of the opening of the base, as shown in Figure 1.

Figure 3:
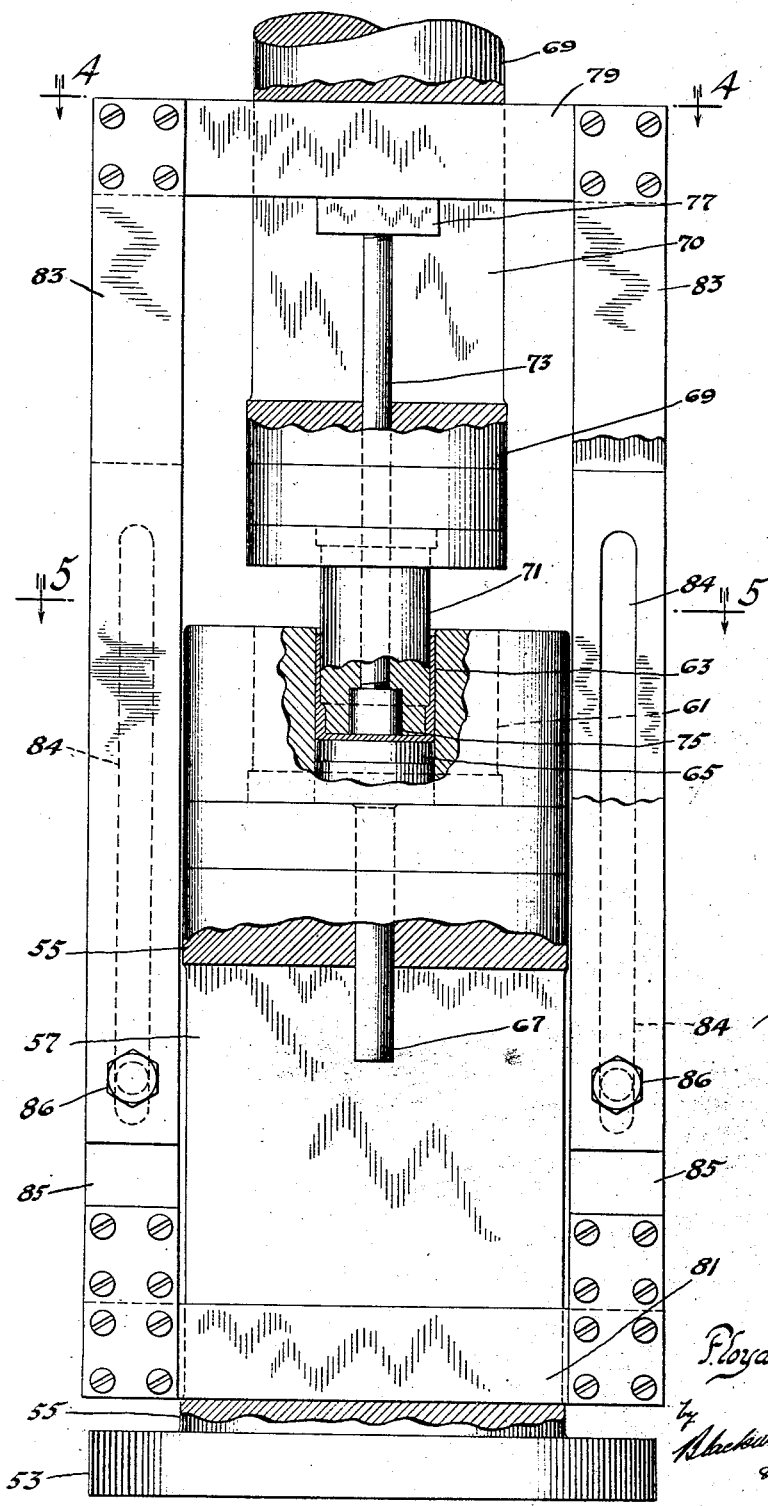
Figure 3 is an elevation of a second piece of apparatus. This is used for flattening the rounded end of the piston cup as it emerges from the machine shown in Figure 1.
Figure 4:
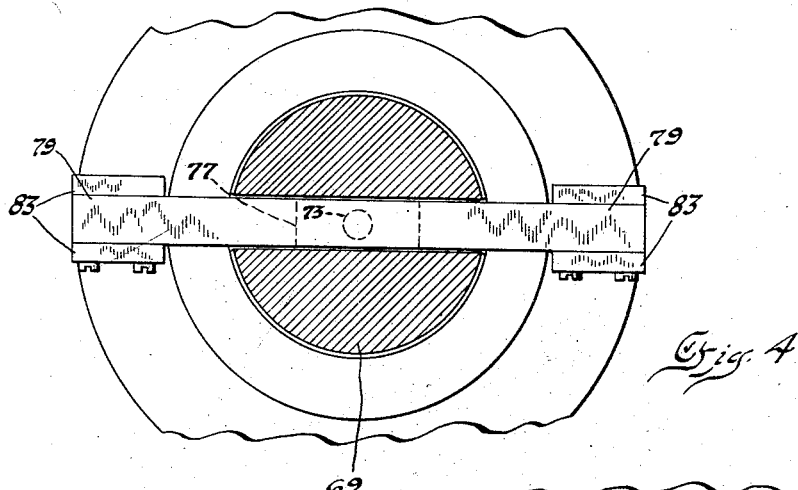
Figure 4 is a section on line 4—4 of Figure 3.
Figure 5:
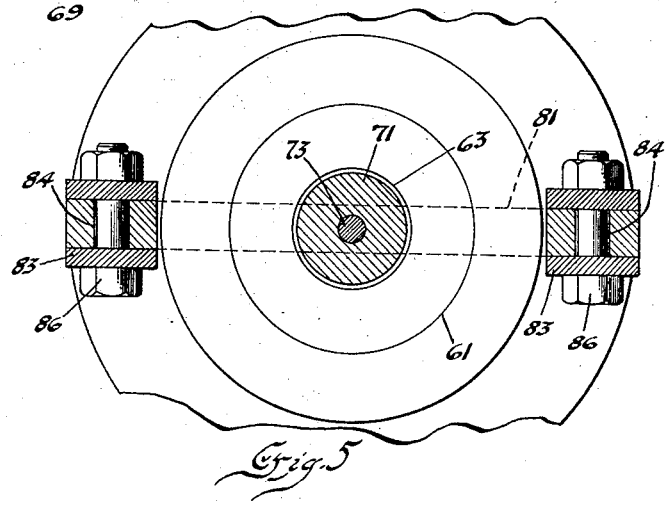
Figure 5 is a section on line 5—5 of Figure 3.

It will be seen that the piston has a rounded edge at 51 spacing the head too far from the side wall. The next step in the process is to flatten this curved surface. For this purpose I use the following apparatus which is illustrated in Figures 3, 4 and 5. The base member 53 carries a cylindrical upper end 55 through which is cut a slot 57. Upon the upper part of 55 is carried a member 61 having a central opening 63 corresponding in size to the outer diameter of the piston. Within the bottom of said opening 63 is a die 65 which is mounted to reciprocate in the opening 63 under the action of a spindle 67.

The spindle 67 passes through an opening in part 55 and into the slot 57. Arranged to reciprocate from above is a shaft 69. This shaft is also provided with a slot 70. The shaft 69 carries at its lower end a plunger 71 having a reduced end to conform to the internal shape of the piston formed by the first step in the process. Slidable through the plunger is a stem 73 having a knock out head 75 at its lower end. The stem is slidable through the lower part of the shaft, below the slot, and within the slot has a head 77.

Mounted to slide in the upper slot 70 is a cross head 79 and slidable in the lower slot 57 is a cross head 81. To the ends of the upper cross head are depending side members 83, between which is a vertical side member 85 extending upwardly from the ends of the lower cross head 81. Slots 84 and bolts 86 permit the securing of the side members in adjusted position. When the plunger descends it enters the piston which has been placed within the opening 63. The engagement of the piston head between the plunger and the die member 65 flattens the head as clearly shown in Figure 3. The plunger is then raised. Should the piston stick to the plunger, the knock out member 75—77 being held by the engagement of upper part 77 with the cross head 79, insures its removal. If the piston should stick in part 61, the upward movement of the rectangular frame, beginning at the time when the cross head 79 is engaged by the shaft 69 at the lower end of the slot 70, causes the engagement of the lower cross head 81 with the spindle 67 and pushes the piston out from the die 61.

The bearings for the wrist pin are then formed in the piston wall and the article is completed.

By the steps described above and with the apparatus referred to, the piston is formed directly from a disc of sheet metal, the disc is heated and the plunger co-operating with the dies forms the piston proper, as shown in Figure 1. The head is then flattened by the apparatus shown in Figures 3, 4 and 5. By these steps we are able to very quickly manufacture a piston having characteristics which are superior to those of the ordinary piston as heretofore manufactured.

It will be obvious that the invention is not limited to the manufacture of pistons as other articles having similar shape can very well be manufactured by a similar process.

I claim:

1. In an apparatus for making pistons, means for flattening the piston head comprising a base having a piston receiving opening, a reciprocatory die forming the bottom of the said opening, a reciprocating plunger entering said piston and co-operating with said die to flatten the piston head and knock out means for said piston said knockout means being operable by movements of said plunger.

2. The combination of elements set forth in claim 1 wherein said knock out means including a rectangular frame having cross heads, one of which moves said die from the bottom of said opening to release the piston.

3. The combination of elements as set forth in claim 1, wherein said knock out means includes a rectangular frame having cross heads, a knock out member slidable relative to said plunger, one of said cross heads engageable with said knock out member to release said piston from said plunger.

In testimony whereof I affix my signature.

FLOYD O. TANNER.